Jan. 5, 1971 — M. SABA — 3,553,568
D-C VOLTAGE REGULATOR INCLUDING BLOCKING OSCILLATOR
Filed Aug. 23, 1968 — 3 Sheets-Sheet 1

Manlio Saba
INVENTOR.

BY
Karl G. Ross
Attorney

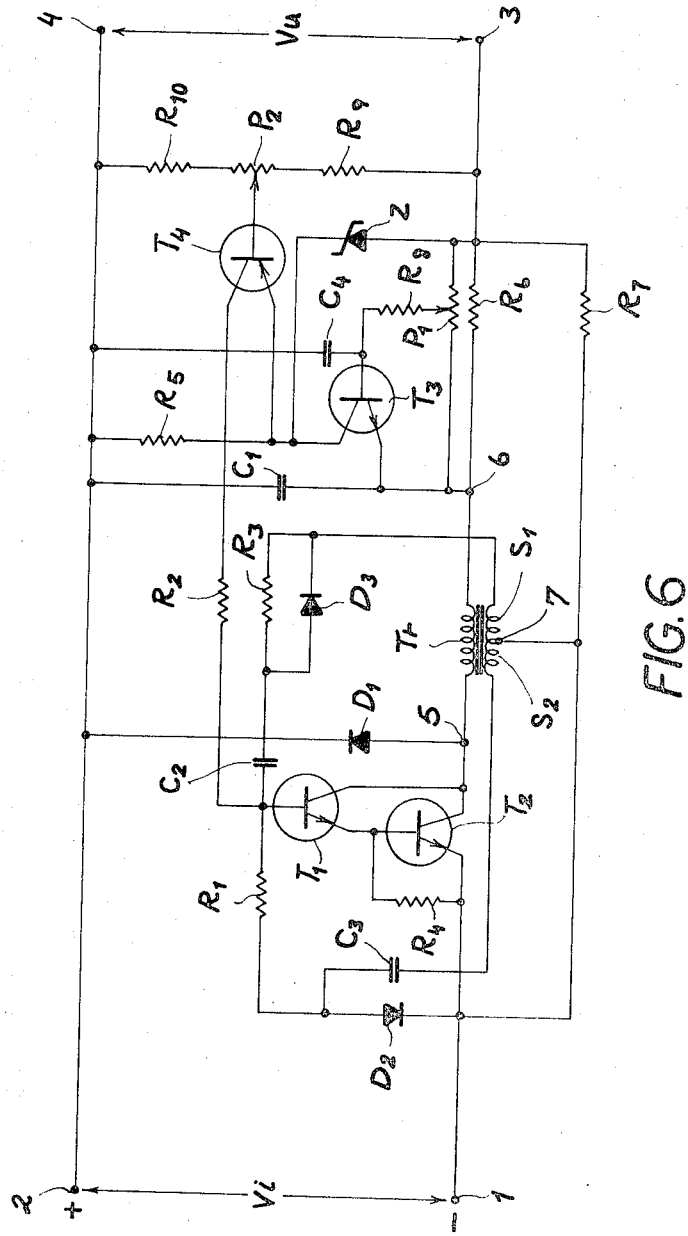

United States Patent Office 3,553,568
Patented Jan. 5, 1971

---

3,553,568
D-C VOLTAGE REGULATOR INCLUDING BLOCKING OSCILLATOR
Manlio Saba, Milan, Italy, assignor to Societa Italiana Telecomunicazioni Siemens S.p.A., Milan, Italy, an Italian corporation
Filed Aug. 23, 1968, Ser. No. 754,796
Claims priority, application Italy, Aug. 24, 1967, 19,747/67
Int. Cl. G05f *1/56, 1/58*
U.S. Cl. 323—9                                                   8 Claims

ABSTRACT OF THE DISCLOSURE

Voltage regulator wherein a transistor in series with the primary of a feedback transformer is driven to intermittent saturation by a capacitive coupling between its input circuit and the secondary of the transformer, the coupling capacitor being connected in series with that secondary across an input resistor of the transistor while a portion of this secondary lies in series with this resistor between the emitter and the base to generate a reverse bias. The input resistor is traversed by current from a control amplifier which responds to a voltage sensor connected across the regulator output and which is blocked by a protective circuit upon the flow of excessive output current.

---

My present invention relates to a D-C voltage regulator of the type wherein a blocking oscillator generates a train of current pulses which, upon integration, are delivered to a load at an output voltage to be held substantially constant in the face of variations of the supply voltage and/or of the load impedance.

Primary or secondary batteries used as sources of direct current provide a progressively decreasing supply voltage which, if it is to be converted into a substantially constant output voltage, requires a regulator responsible to deviations of this output voltage from a predetermined reference value. A regulator of the character referred to above, including a blocking oscillator, alters the available output voltage by changing the frequency and/or the duration of its current pulses, thus compensating for input-voltage variations in a virtually nondissipative manner. Such a regulator, using a switching transistor which alternates between saturation and cutoff, has been described on pages 956–958 of the July 1963 issue of the Bell System Technical Journal. In this type of regulator a switching transistor has its output electrode (e.g. collector) and its common electrode (e.g. emitter) connected in series with a primary winding of a feedback transformer whose secondary winding is reactively coupled, in a regenerative connection, to the input circuit of the transistor which includes the aforementioned common electrode along with a control electrode (e.g. base). By virtue of this connection, a feedback current generated in this input circuit progressively decays and subsequently reverses in polarity to determine the instants at which the transistor goes to saturation and to cutoff. These instants are codetermined by a control current from a voltage sensor in the load circuit of the system so that their timing provides the desired compensation for deviations of the output voltage to be stabilized.

The voltage level at which the transistor becomes conductive, i.e. the start of is "on" cycle, is not fixed but depends on the magnitude of the load current to be drawn, a larger load current requiring the flow of a larger base current and, therefore, a higher input voltage across the emitter and base. Since, during the "off" cycle, the feedback current decays from its reverse peak along an exponential curve, a relatively minor shift in the threshold of conduction may result in a relatively large variation of the duration of the "off" cycle. Thus, widely fluctuating load impedances may lead to appreciable shifts in switching frequency so that the usual integrating and filtering networks inserted between the blocking oscillator and the load must be effective over a considerable frequency range. In practice, frequency ratios as high as 10:1 between the upper and lower limits of that range are not uncommon. Appreciable switching losses may occur at the higher frequencies and the suppression of switching noise becomes more difficult at the upper end of the range.

The "on" cycle of the transistor, i.e. its period of saturation, is determined by the control current from the voltage sensor and by invariable circuit parameters which establish a minimum duration for this period when the control current goes to zero. This minimum duration restricts the choice of available output voltages since the magnitude of the latter cannot drop below a limit dependent upon the minimum saturation time and the maximum cutoff period attainable, the termination of this cutoff period being somewhat uncertain in the presence of a low control current in view of the asymptotic decay of the blocking voltage generated by the inverted feedback current.

It is, therefore, a general object of my present invention to provide an improved circuit arrangement for the purpose set forth which avoids the aforestated drawbacks.

More specifically, my invention aims at providing a voltage regulator which offers an extended scale of step-down ratios between the input and output voltages and which, at the same time, operates over a relatively narrow band of switching frequencies.

In accordance with an important feature of my invention, I provide a source of reverse bias in the input circuit of the switching transistor to oppose the control current which determines the duration of the conductive and nonconductive periods; if this control current tends toward zero, the reverse bias foreshortens the period of conductivity (and, incidentally, lengthens the time of cutoff) so that the output voltage, corresponding to the integrated value of the current pulses passed by the transistor, drops to a relatively low level. This enables the ouput voltage to be pegged at a small fraction of the average input voltage.

According to another aspect of my invention, a transient voltage opposing the blocking effect of the inverted feedback current is developed across a reactance in the feedback circuit, advantageously a portion of the secondary winding of the feedback transformer thereof, to accelerate the start of a new conductive cycle, thereby increasing the slope of the exponential curve along which the base/emitter voltage of the transistor rises toward the threshold of conduction. This steepening of the curve minimizes the frequency shift resulting from a change in load current; if combined with the aforedescribed reverse bias, this measure also cancels at least in part the effect of that bias upon the duration of cutoff so that the frequency excursions of the oscillator output are held within narrow limits.

In a particularly advantageous embodiment, the transient voltage derived from a portion of the transformer secondary is rectified and integrated during periods of saturation, in which its polarity is opposed to that of the control current, to produce the aforedescribed biasing voltage. With a system of this character it is possible to convert a variable input voltage in a range of, say, 40 to 70 volts into a substantially constant output voltage of, say, 12 volts, compared with a minimum output voltage of 24 volts obtainable with generally similar regulators of the prior art.

The invention will be described in greater detail hereinafter with reference to the accompanying drawing in which:

FIG. 6 is a more elaborate circuit diagram of a regulator combining the features of FIGS. 3 and 4.

Figure 1:
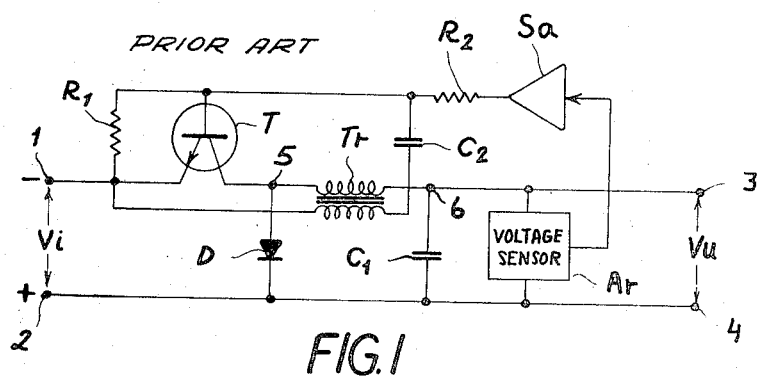
FIG. 1 is a circuit diagram of a voltage regulator broadly similar to that described in the aforementioned article of the Bell System Technical Journal.

In FIG. 1 I have shown a regulator inserted between a pair of input terminals 1, 2 and a pair of output terminals 3, 4, a continuous input voltage $Vi$ being delivered to terminals 1, 2 by a dry cell, storage battery or some other variable D-C power supply while an output voltage $Vu$ is developed across the terminals 3, 4 connected to a load not shown. The latter connection may include a low-pass filter and other conventional circuitry designed to suppress ripples in the output current. Terminals 2 and 4 are shown interconnected and may in fact be replaced by a common point of fixed reference potential (e.g. ground).

A transistor T, here shown to be of the NPN type, has its emitter connected to the negative input terminal 1 and its base connected to the emitter through an input resistor $R_1$. The collector of this transistor is connected to the live output terminal 3 through the primary winding of a feedback transformer $Tr$ whose secondary winding is connected across the emitter and base of the transistor in series with a capacitor $C_2$. Another condenser $C_1$ and a diode D are connected between opposite terminals of the transformer primary and the common positive terminals 2, 4, diode D being so oriented as to block the direct flow of collector current therethrough while permitting the charging of condenser $C_1$ through the primary of transformer $Tr$ in the high-impedance state of transistor T. A voltage sensor $Ar$ is connected across terminals 3 and 4 to determine the magnitude of voltage $Vu$, by comparing it with a fixed reference voltage as more fully described hereinafter in connection with FIG. 6; the output of the voltage sensor represents an error signal fed to an amplifier $Sa$ which in turn delivers a proportional control current to a voltage divider constituted by the input resistor $R_1$ and a second resistor $R_2$ ahead of the junction of condenser C with the base of transistor T.

In the operation of the system of FIG. 1 the presence of an error signal in the output of sensor $Ar$ gives rise to a control current through resistor $R_1$ of a polarity tending to turn on the transistor T. In the absence of a sufficient opposing charge on condenser $C_2$, transistor T begins to conduct so as to draw a collector current through the primary of transformer $Tr$. This induces in the secondary of the transformer a feedback current of a polarity aiding the aforementioned control current so that the base of transistor T is rapidly driven positive, thereby bringing the transistor to saturation. Owing to the presence of condenser $C_2$ this feedback current progressively decays until it reaches a point of incipient desaturation; the resting drop in collector current intensifies the decay of the charging current of condenser $C_2$ so that transistor T is virtually instantly cut off. Primary current continues, however, to circulate for a while through diode D and condenser $C_1$, via junctions 5 and 6, to help smooth the current pulse passed by transistor T; at the same time, the secondary current reverses as the condenser $C_2$ begins to charge through resistor $R_1$, thereby gradually reducing the negative bias of the transistor base until the threshold of conduction is reached again and the cycle is repeated.

Figure 2A:
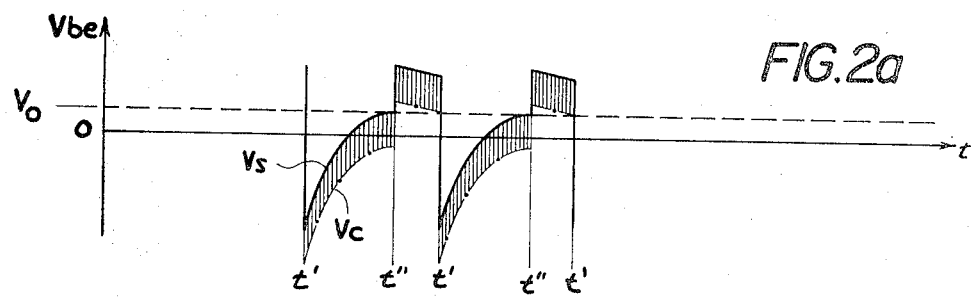
FIGS. 2a and 2b are a set of graphs useful in explaining the operation of the system of FIG. 1.
Figure 2B:
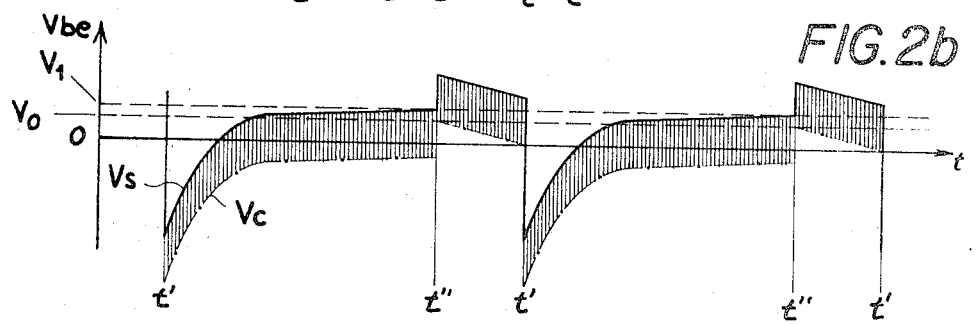

FIGS. 2a and 2b show the base/emitter voltage $Vbe$ of the transistor for a relatively small collector current (idling) and a relatively large collector current (operation under load), respectively.

Curve $Vc$ represents the voltage developed across resistor $R_1$ as the result of the discharge of condenser $C_2$, in the absence of a control current from amplifier $Sa$; this voltage aperiodically tends toward zero. Curve $Vs$ indicates the actual driving voltage in the presence of a control current from amplifier $Sa$, the vertically shaded area representing the voltage component due to this control current.

At instant $t'$, the transistor T is cut off; at instant $t''$ it goes to saturation, curve $Vs$ reaching at that point the threshold of incipient conduction. Under light load, FIG. 2a, this threshold lies at a relatively low voltage level $V_0$. With heavier loads, causing a larger collector current to be drawn, the threshold lies at the higher level $V_1$ shown in FIG. 2b. A comparison of FIGS. 2a and 2b shows a rather wide swing in switching frequencies, owing to a considerable disparity between the cutoff periods $t'-t''$; since voltage curve $Vs$ follows the exponential law of curve $Vc$, its intersection with level $V_1$ is rather indistinct so that the start of the conductivity period $t''-t'$ cannot be predetermined with precision. The increase in this conductivity period apparent from FIG. 2b is due to the larger error signal emanating from voltage sensor $Ar$ in response to the greater current consumption by the load and the resulting reduction of output voltage $Vu$; were it not for the shift in threshold from level $V_0$ to level $V_1$, this increased control voltage would also result in a contraction of cutoff period $t'-t''$.

Figure 3:
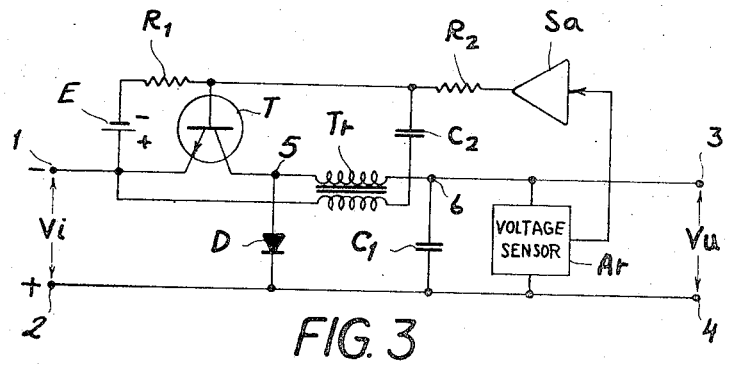
FIG. 3 is a circuit diagram similar to FIG. 1, illustrating an improved regulator according to my present invention.

The voltage regulator shown in FIG. 3 differs from that of FIG. 1 only by the insertion of a source of reverse bias E, shown diagrammatically as a battery, between the emitter and the base of transistor T in series with input resistor $R_1$.

A corresponding increase in the gain of amplifier $Sa$ will allow the system of FIG. 3 to operate substantially in the manner illustrated in FIGS. 2a and 2b under different loading conditions; with minimum loads, however, the negative bias voltage from source E overcomes the positive bias from amplifier $Sa$ in an early part of saturation cycle so that the length of this cycle can be reduced below the lower limit otherwise imposed by the circuit parameters (including the magnitude of resistor $R_1$) which determine the discharge rate of condenser $C_2$. Thus, the system of FIG. 3 enables the attainment of a stabilized output voltage $Vu$ considerably lower than that realizable by the system of FIG. 1.

Figure 4:
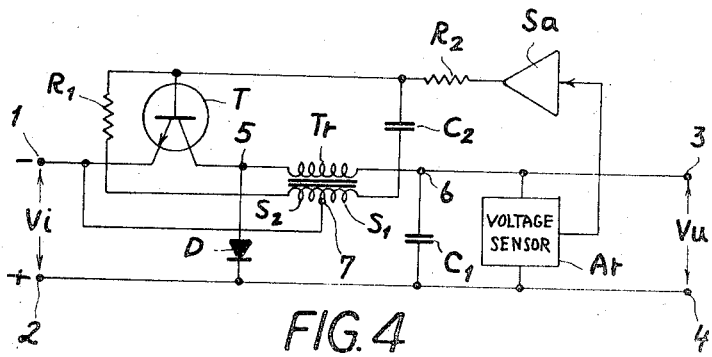
FIG. 4 is a diagram similar to FIG. 3, illustrating a modification.

In FIG. 4 I have shown another regulator similar to that of FIG. 1 wherein, however, the secondary of transformer $Tr$ has been split into two winding portions $S_1$ and $S_2$ whose junction 7 is returned to negative terminal 1 and to the emitter of transistor T so that winding portion $S_2$ lies in series with resistor $R_1$ across the input of the transistor. When the condenser $C_2$ discharges during the cutoff period, winding portion $S_2$ develops a transient voltage which opposes the blocking effect of the discharge current, thereby accelerating the positive-going rise of the base potential of the transistor so that the latter is turned on sooner than would otherwise be the case. During saturation, the polarity of this transient voltage is reversed so that the effect is similar to that of the biasing source E shown in FIG. 3.

Figure 5:
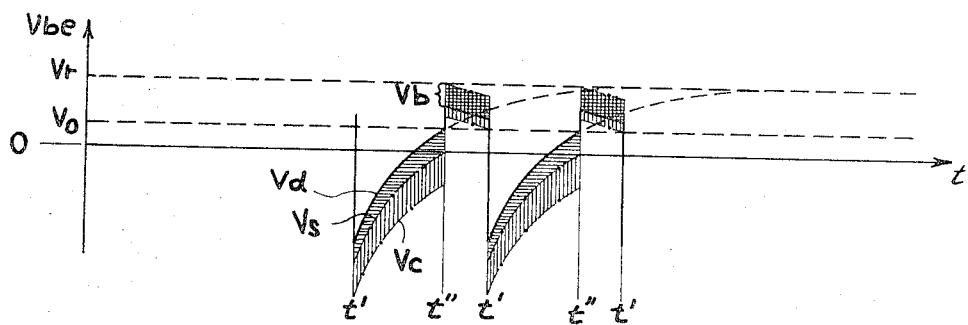
FIG. 5 is a graph serving to explain the mode of operation of my improved regulator.

FIG. 5 illustrates the combined effect of the two measures just described upon the driving voltage $Vd$ of transistor T, this driving voltage following a curve which is similar to curve $Vs$ but is elevated thereabove by the transient voltage across winding $S_2$ whose magnitude is represented by the horizontally shaded area in FIG. 5. Curve $Vd$, asymptotically approaching a level $Vr$, intersects the voltage level $V_0$ (and therefore also the level $V_1$) at a steeper angle than curve $Vs$ (cf. FIGS. 2a and 2b) so that even a substantial change in load impedance will not materially alter the duration of the cutoff period $t'-t''$.

FIG. 5 also shows at V$b$ the extent to which the driving voltage is depressed by the reverse bias during the saturation period, thereby foreshortening this period as the base potential drops more rapidly to the desaturation point. Thus, with smaller error signals (indicative of virtual absence of load), the "on" period $t''-t'$ can be substantially shorter than that illustrated in FIG. 2$a$.

Reference will now be made to FIG. 6 for a description of a regulator embodying a combination of the features described in connection with FIGS. 3 and 5. Transistor T of the preceding embodiments has been replaced by a two-stage blocking oscillator $T_1$, $T_2$, the emitter of stage $T_1$ being connected to the base of stage $T_2$ whose base/emitter path is bridged by a resistor $R_4$ designed to limit the base current flowing into this stage.

Diode $D_1$, replacing the diode D of the preceding figures, is connected between the common positive terminals 2, 4 and the collectors of the two transistor stages. Input resistor $R_1$ lies, in series with a diode $D_2$, between negative terminal 1 and the base of transistor stage $T_1$, this negative terminal being also connected to the emitter of stage $T_2$ and to the junction 7 of winding portions $S_1$, $S_2$ of transformer T$r$. The feedback circuit including the secondary $S_1$, $S_2$ also comprises the aforedescribed capacitor $C_2$ and a further capacitor $C_3$, the series combination of impedances $S_2$, $C_3$ being connected across the diode $D_2$ so as to constitute therewith a rectification and integration circuit for transient voltages developed across winding $S_2$ during saturation of transistors $T_1$ and $T_2$. Also included in the feedback circuit is a resistor $R_3$ which is bridged by a diode $D_3$ of such polarity as to short-circuit this resistor for current flowing upon the discharge of condenser $C_3$ during cutoff; thus, the unsymmetrically conductive impedance combination $R_3$, $D_3$ limits the magnitude of the charging current during transistor saturation without materially affecting the duration of the recovery period or cutoff cycle.

The signal amplifier S$a$ of FIGS. 1, 3 and 4 is represented in FIG. 6 by an auxiliary transistor $T_4$, here shown to be of the PNP type, having its collector connected via resistor $R_2$ to the base of stage $T_1$ and having its emitter returned to output terminal 3 via a Zener diode Z; this Zener diode is bridged in series with a resistor $R_5$ across output terminals 3 and 4 to form a voltage divider which, upon breakdown of diode Z, develops a constant reference voltage to bias the emitter of auxiliary transistor $T_4$ at a fixed potential with reference to terminal 3. The base of transistor $T_4$ is tied to a variable tap of a potentiometer $P_2$ forming part of another voltage divider connected across output terminals 3 and 4, the latter voltage divider also including two fixed resistors $R_9$ and $R_{10}$. Another fixed resistor $R_6$ is connected between terminal 3 and junction 6 in series with the primary of transformer T$r$, this resistor being shunted by a potentiometer $P_1$ whose slider is tied via a resistor $R_8$ to the base of a further auxiliary transistor $T_3$ having its emitter connected to junction 6 and its collector connected to the emitter of auxiliary transistor $T_4$. A condenser $C_4$, forming a leakage path for transient voltages, is connected between the base of transistor $T_3$ and the common terminals 2, 4. A further resistor $R_7$ lies between terminal 3 and junction 7 to provide a starting connection serving to turn on the blocking oscillator $T_1$, $T_2$ when power is first connected thereto.

In operation, potentiometer $P_2$ is preset to establish an output voltage V$u$ bearing a selected relationship with the reference voltage maintained by Zener diode Z; thus, for example, if the slider of the potentiometer lies at the midpoint of the voltage divider $R_9$, $P_2$, $R_{10}$, voltage V$u$ will be stabilized at twice the reference voltage across diode Z. As long as the value of V$u$ equals or exceeds this chosen magnitude, sensing transistor $T_4$ remains nonconductive and no control current passes through input resistor $R_1$ of transistor oscillator $T_1$, $T_2$. When the output voltage V$u$ falls below the selected level, the error signal picked up at potentiometer $P_2$ is magnified and produces a control current which turns on the first transistor stage $T_1$ and, immediately thereafter, the second stage $T_2$ in cascade therewith. During saturation, the transient voltage developed across winding portion $S_2$ has a polarity tending to block the transistor $T_1$; this negative voltage is integrated by the unidirectionally effective circuit $C_3$, $D_2$ so as to give rise to a steady biasing potential on condenser $C_3$ comparable to that of the biasing source E shown in FIG. 3. During the recovery period $t'-t''$ (FIG. 5), winding $S_2$ develops a voltage drop of opposite polarity across the small forward resistance of diode $D_2$ to reduce the cutoff time and steepen the curve V$d$ of FIG. 5 as previously discussed.

If a short circuit should develop across terminals 3 and 4, or if the load current becomes otherwise excessive, potentiometer $P_1$ prevents overloading of the power supply by biasing the transistor $T_3$ to saturation, thereby shorting out the Zener diode Z so that the potential of the emitter of transistor $T_4$ is reduced to that of terminal 3 and this transistor is blocked. As a result of this protective arrangement, oscillator $T_1$, $T_2$ is deprived of control current and remains cut off until the defect has been cured.

In practice, a system according to my present invention may operate within a range of switching frequencies varying by not more than 10%.

It may be noted that condenser $C_2$ can also be omitted since, as discussed in the aforementioned article of the Bell System Technical Journal, the finite inductance of transformer T$r$ will also act as a reactance to diminish and reverse the flow of feedback current. As shown in that article, the secondary winding of transformer T$r$ can be represented by the parallel combination of an ideal secondary and an inductance performing the function of condenser $C_2$. Naturally, this secondary can also be bridged by a real shunt inductance replacing or supplementing the series capacitor $C_2$. These and other modifications, readily apparent to a person skilled in the art, are intended to be embraced within the spirit and scope of my invention except as otherwise limited by the appended claims.

I claim:

1. A voltage regulator for converting a variable input voltage into a substantially constant output voltage, comprising a pair of input terminals connectable across a source of direct current and a pair of output terminals connectable across a load; first conductor means connecting one of said input terminals to one of said output terminals; second conductor means connecting the other of said input terminals to the other of said output terminals; a transformer having a primary winding inserted in said first conductor means; transistor means having an input circuit including a control electrode and a common electrode, said transistor means further having an output electrode connected along with said common electrode in said first conductor means in series with said primary winding, said transformer having a secondary winding reactively coupled to said input circuit in a regenerative feedback connection to generate a reversible current flow alternatively switching said transistor between saturation and cutoff, thereby defining alternating conductive and nonconductive periods; a generator of control current responsive to voltage variations across said output terminals for supplementing said current flow to vary the duration of said conductive periods in a sense compensating for deviations of the output voltage from a predetermined magnitude; and reverse-biasing means in said input circuit opposing said control current to foreshorten said conductive periods, said reverse biasing means including a unidirectionally effective integrating circuit connected across a portion of said secondary winding.

2. A voltage regulator as defined in claim 1 wherein said feedback connection includes a capacitor in series with said secondary winding.

3. A voltage regulator as defined in claim 2 wherein said feedback connection further includes diode-shunted resistance means in series with said capacitor for limiting the flow of charging current during said conductive periods while facilitating the flow of discharging current during said nonconductive periods.

4. A voltage regulator as defined in claim 1 wherein said generator includes a source of fixed reference voltage and sensing means for comparing said reference voltage with said output voltage, thereby producing an error signal determining the magnitude of said control current.

5. A voltage regulator as defined in claim 4 further comprising switch means for short-circuiting said source of reference voltage in response to a flow of excess load current in said output circuit, thereby suppressing said control current and extending the nonconductive state of said transistor.

6. A voltage regulator as defined in claim 4 wherein said source of reference voltage comprises a Zener diode.

7. A voltage regulator for converting a variable input voltage into a substantially constant output voltage, comprising a pair of input terminals connectable across a source of direct current and a pair of output terminals connectable across a load; first conductor means connecting one of said input terminals to one of said output terminals; second conductor means connecting the other of said input terminals to the other of said output terminals; a transformer having a primary winding inserted in said first conductor means; transistor means having an input circuit including a control electrode and a common electrode, said transistor means further having an output electrode connected along with said common electrode in said first conductor means in series with said primary winding, said transformer having a first secondary winding reactively coupled to said input circuit in a regenerative feedback connection to generate a reversible current flow alternately switching said transistor between saturation and cutoff, thereby defining alternating conductive and nonconductive periods; a generator of control current responsive to voltage variations across said output terminals for supplementing said current flow to vary the duration of said conductive periods in a sense compensating for deviations of the output voltage from a predetermined magnitude; and another secondary winding on said transformer in series with said first secondary winding connected to said input circuit for generating therein a transient voltage tending to turn on said transistor, thereby foreshortening said nonconductive periods.

8. A voltage regulator as defined in claim 7 wherein said feedback connection further includes a capacitor and a diode-shunted resistance in series with said secondary windings limiting the flow of charging current during said conductive periods while facilitatng the flow of discharging current during said nonconductive periods.

References Cited
UNITED STATES PATENTS

| | | | |
|---|---|---|---|
| 3,040,235 | 6/1962 | Schemel et al. | 323—9X |
| 3,304,489 | 2/1967 | Brolin et al. | 323—9 |
| 3,383,584 | 5/1968 | Atherton | 323—22X(T) |
| 3,405,341 | 10/1968 | Buchowski | 323—9X |
| 3,461,377 | 8/1969 | Reese | 323—22(T) |

J D MILLER, Primary Examiner

A. D. PELLINEN, Assistant Examiner

U.S. Cl. X.R.

321—2; 323—17, 22